United States Patent

Hwang et al.

[11] Patent Number: 5,842,809
[45] Date of Patent: Dec. 1, 1998

[54] PLASTIC MOLD FIXING STRUCTURE FOR CHASSIS

[75] Inventors: Haksun Hwang; Inki Cheon, both of Seoul; Sang Jig Lee, Kyungki-Do; Pohyoung Koh, Kyungki-Do; Hyeoksoo Park, Kyungki-Do; Sungwoo Choi, Kyungki-Do, all of Rep. of Korea

[73] Assignee: LG Electronics, Inc., Seoul, Rep. of Korea

[21] Appl. No.: 889,068

[22] Filed: Jul. 7, 1997

Related U.S. Application Data

[63] Continuation of Ser. No. 557,574, Nov. 14, 1995, abandoned.

[51] Int. Cl.$^6$ ................................. G11B 15/00
[52] U.S. Cl. ................. 403/263; 403/269; 403/383
[58] Field of Search ............... 403/383, 22, 263, 403/269

[56] References Cited

U.S. PATENT DOCUMENTS

| | | | |
|---|---|---|---|
| 495,783 | 4/1893 | Cavallaro | 403/22 |
| 695,614 | 3/1902 | Lape | 403/263 X |
| 1,256,706 | 2/1918 | Lewis | 403/263 X |
| 1,774,799 | 9/1930 | Loudenslager | 403/269 X |
| 2,317,231 | 4/1943 | Swedman | 403/263 X |
| 2,436,908 | 3/1948 | Van Weenen et al. | 403/263 X |
| 2,550,560 | 4/1951 | Heron | 403/263 X |
| 2,579,011 | 12/1951 | Pieper | 403/383 X |
| 2,932,369 | 4/1960 | Huguenin | 403/22 |
| 3,309,123 | 3/1967 | Edwards | 403/269 X |
| 4,407,598 | 10/1983 | Hendershot | 403/269 X |
| 4,600,333 | 7/1986 | Rohrig et al. | 403/269 X |
| 4,786,201 | 11/1988 | Huetter et al. | 403/22 |
| 4,957,449 | 9/1990 | Hatagishi | 403/22 X |

FOREIGN PATENT DOCUMENTS

| | | | |
|---|---|---|---|
| 36280 | 1/1930 | France | 403/269 |
| 854731 | 11/1952 | Germany . | |
| 380911 | 6/1940 | Italy | 403/269 |
| 1186824 | 4/1970 | United Kingdom | 403/263 |

*Primary Examiner*—Anthony Knight
*Attorney, Agent, or Firm*—Birch, Stewart, Kolasch & Birch, LLP

[57] ABSTRACT

A molded plastic fixing structure for a chassis which includes a chassis having upper and lower surfaces and an opening; a boss disposed in the opening in the chassis and extending above the upper surface of the chassis; at least one of upper and lower boss supporting sections integrally formed with the boss, the boss supporting sections being flush with and not extending beyond the corresponding chassis surface; and a fixing support groove recessed around the central opening and disposed in at least one of the upper and lower surfaces of the chassis, at least one of the upper and lower boss supporting sections being molded in the corresponding fixing support groove.

8 Claims, 3 Drawing Sheets

PLASTIC MOLD FIXING STRUCTURE FOR CHASSIS

This application is a continuation, of application Ser. No. 08/557,574 filed on Nov. 14, 1995, now abandoned.

BACKGROUND OF THE INVENTION

1. Field of the Invention

The present invention relates to a plastic mold fixing structure for a chassis, and more particularly to an improved plastic mold fixing structure for a chassis capable of preventing a plastic mold from becoming movable from and coming off of a chassis in the state where the upper and lower surfaces of the supporting section of a mold boss do not protrude beyond either the upper surface nor the lower surface of the chassis.

2. Description of the Conventional Art

Referring to FIGS. 1A and 1B, the conventional plastic mold fixing structure for a chassis includes a central opening 2 formed at a central portion of the chassis 1, and a pair of engaging openings 3 formed on the chassis 1, the openings 3 being spaced apart from each other about the central opening 2. The conventional plastic mold fixing structure for a chassis is directed to forming a plastic mold inside the central opening 2 and the engaging openings 3 of the chassis 1 so as to form a mold boss 4 and a supporting section 5.

The mold boss 4 is used as a member, such as a rotary shaft, disposed on a chassis or a fixing member which is fixed to a predetermined portion of the chassis 1.

Therefore, the mold boss 4 should have a predetermined shape for the above-mentioned purposes, so that the size of the supporting section 5 is larger than that of the mold boss 4.

Generally, the upper and lower surface of the supporting section 5 protrudes upwardly and downwardly, the upper and lower surfaces being beyond the upper and lower surface of the chassis 1.

Therefore, since the conventional plastic mold fixing structure, as shown in FIGS. 1A and 1B, is supported by the engaging openings 3, the mold boss 4 cannot rotate and come out of the chassis 1 after the plastic molding is completed.

However, when there is provided a certain rotatable member 6 at a predetermined portion of the supporting section 5 protruded upwardly and downwardly from the chassis 1, since the rotation of the rotatable member 6 interferes with the protruded parts of the supporting section 5, the rotatable member 6 should disadvantageously be relocated.

In particular, in case of a camcorder of 8 mm, since there is not a substantial amount of space in the system, obtaining more space in the system is necessary.

In addition, FIG. 2 shows another construction of a conventional plastic mold fixing structure for a chassis.

As shown therein, there is not formed any kind of engaging opening therein but rather a central opening 12.

In addition, the supporting section 15 does not protrude beyond the lower surface of the chassis 11, and a plastic mold is filled inside the central opening 12 of the chassis 11, and the mold boss 14 is integral with the supporting section 15.

At this time, since there are no protruding sections extending beyond the upper and lower surfaces of the chassis 11, the rotation of the rotatable member 16 does not interfere with other elements. However, after the plastic molding is completed, the mold boss 14 is not properly fixed thereto and thus becomes disengaged from the structure.

SUMMARY OF THE INVENTION

Accordingly, it is an object of the present invention to provide a plastic mold fixing structure for a chassis, which overcomes the problems encountered in a conventional plastic mold fixing structure for a chassis.

It is another object of the present invention to provide an improved plastic mold fixing structure for a chassis capable of preventing a plastic mold from becoming movable from and coming off and out of a chassis wherein the upper and lower surfaces of the supporting section of a mold boss do not protrude to be beyond either the upper surface nor the lower surface of the chassis.

To achieve the above objects, in accordance with a first embodiment according to the present invention, there is provided a plastic mold fixing structure for a chassis, which includes a chassis having a central opening; a boss formed on the upper surface and the lower surface of the chassis; and a boss supporting section integrally formed with the boss and having an upper surface and a lower surface, both the upper surface and the lower surface of the boss supporting section being not protruded beyond the upper surface and the lower surface of the chassis.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE INVENTION

Figure 1A:
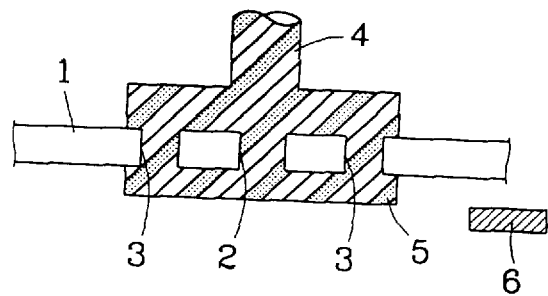
FIG. 1A is a plan view showing a construction of a conventional chassis.
Figure 1B:
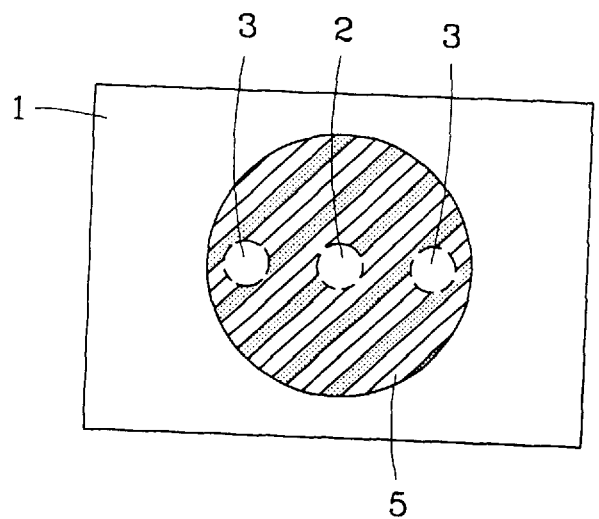
FIG. 1B is a cross-sectional view showing a plastic mold fixed to a conventional chassis.
Figure 2:
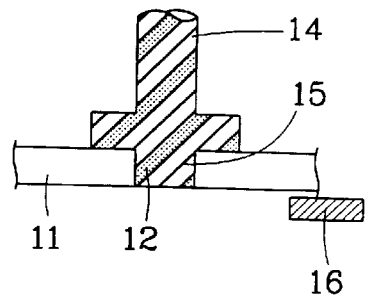
FIG. 2 is another cross-sectional view showing a plastic mold fixed to a conventional chassis.
Figure 3A:
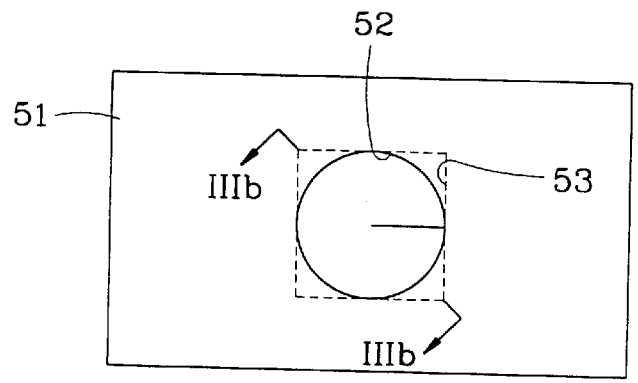
FIG. 3A is a plan view showing a chassis of a first embodiment according to the present invention.
Figure 3B:
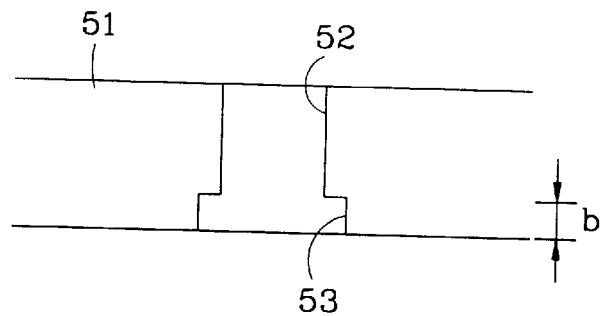
FIG. 3B is a cross-sectional view taken from a line IIIb—IIIb of FIG. 3A according to the present invention.

Referring to FIGS. 3A and 3B, a plastic mold fixing structure for a chassis of a first embodiment according to the present invention will now be explained.

To begin with, the plastic mold fixing structure for a chassis includes a central opening 52 formed at a central portion of a chassis 51, and a rectangular lower fixing support groove 53 formed to have a predetermined size for substantially receiving the size of the central opening 52.

The depth of the central opening 52 is less than the thickness of the chassis 51.

The plastic mold is formed inside the central opening 52 of the chassis 51 so as to integrally form the mold boss 54 and the supporting section 55.

Figure 4:
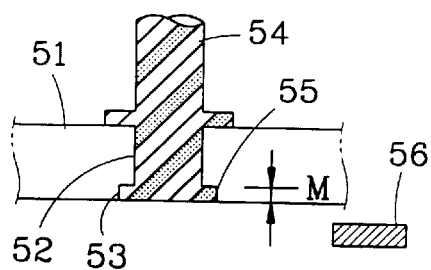
FIG. 4 is a cross-sectional view of a chassis fixed with a plastic mold at state of a chassis of FIG. 3B.

FIG. 4 shows a plastic mold fixed to the chassis.

The distance "b" between the lower surface of the chassis 51 and the upper surface of the mold supporting section 55 as shown in FIG. 3B is larger than or equal to the distance "M" between the lower surface of the mold supporting section 55 and the upper surface of the lower fixing support groove 53 as shown in FIG. 4.

Since the mold supporting section 55 is fixed to the fixing support groove 53 formed on a lower portion of the central opening 52 of the chassis 51, the plastic mold does not come out of the inside of the chassis 51.

In addition, when a rotatable member 56 is disposed at a predetermined portion of the lower surface of the chassis 51, since the plastic mold, does not protrude in a downward direction of the chassis 51, the rotatable member 56 is movable without any interference from any elements.

Figure 5:
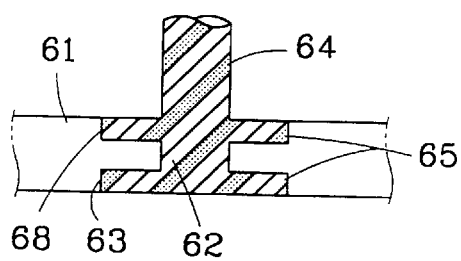
FIG. 5 is a cross-sectional view showing a chassis fixed with a plastic mold of a second embodiment according to the present invention.

The plastic mold fixing structure for a chassis of a second embodiment according to the present invention will now be explained with reference to FIG. 5.

As shown therein, a central opening 62 having a rectangular upper fixing support groove 68 having a predetermined size substantially receiving the size of a mold boss 64 and a rectangular lower fixing groove 63 having a predetermined size substantially receiving the size of the mold boss 64 is formed at an upper surface of the chassis 61 and at a lower surface thereof. At this time, the surface levels of the chassis 61 and the upper surface of the upper fixing support groove 65 are the same, and the surface levels of the lower surface of the chassis 61 and the lower surface of the lower fixing support groove 62 are the same.

Since the second embodiment of the present invention additionally includes the upper fixing support groove 68 compared with the first embodiment, when a certain rotatable member (not shown) is disposed at a predetermined portion of the upper surface of the chassis or at a predetermined portion of the lower surface thereof, there is not any kind of interference therebetween.

Figure 6:
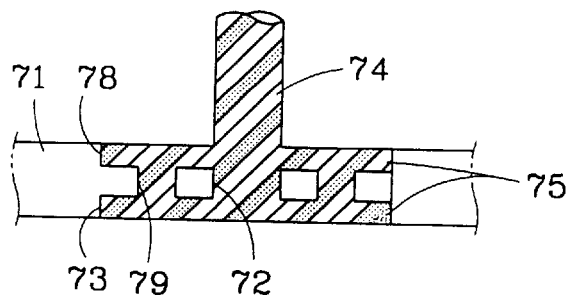
FIG. 6 is a cross-sectional view showing a chassis fixed with a plastic mold of a third embodiment according to the present invention.

The plastic mold fixing structure for a chassis of a third embodiment according to the present invention will now be explained with reference to FIG. 6.

To begin with, as shown therein, a central opening 72 having a rectangular upper fixing support groove having a predetermined size substantially receiving the outer circle of a mold boss 74 and a rectangular lower fixing support groove 73 having a predetermined size substantially receiving the outer circle of a mold boss 74 is formed at a central portion of a chassis 71. In addition, a plurality of spaced-apart engaging openings 73 each having a predetermined diameter are formed at the bottom surface of the upper fixing support groove 78 and the lower fixing support groove 73, respectively.

The plastic mold fixing structure for a chassis is directed to integrally forming the mold boss 74 and the supporting section 75 by forming a plastic mold inside the central opening 72 and the engaging opening 73 of the chassis 71.

The third embodiment of the present invention is capable of achieving a better mold formation between the chassis and the plastic mold even in case that the height of the mold boss is high and the width thereof is wide.

As described above, the plastic mold fixing structure for a chassis has advantages in that a better engaging condition between the chassis and the plastic mold is possible even when the plastic mold is not protruded beyond the surface of the chassis, so that the plastic mold is not rotatable therein and does not come off from the chassis.

In addition, since the plastic mold is not protruded beyond the surface of the chassis, there is no interference with other elements, thus allowing a more compact size product.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A molded plastic fixing structure for a chassis, comprising:

a chassis having upper and lower surfaces and a substantially circular central opening therethrough;

a substantially cylindrical boss disposed in the opening in the chassis, and extending above the upper surface of the chassis, said boss penetrates through said opening and substantially contacts the chassis within said opening;

at least one of upper and lower substantially rectangular boss supporting sections integrally formed with the boss, said boss supporting sections being flush with the corresponding chassis surface, each supporting section including a width dimension which is substantially greater than a diameter of said boss;

a substantially rectangular fixing support groove recessed around the opening and disposed in at least one of the upper and lower surfaces of the chassis and having a predetermined depth and a predetermined size from both the upper and lower surfaces of the chassis, said support groove having a width dimension which is substantially greater than a diameter of said opening, said fixing support groove preventing said boss from dislodging from said chassis during rotation of said boss, said opening and said support groove are aligned along one central axis, said opening intersects said support groove, and at least one of said upper and lower boss supporting sections being molded and disposed in and contacting the corresponding fixing support groove; and a movable member mounted on the chassis at the boss so as to move in contact with said lower surface of said chassis and said boss supporting section.

2. The structure of claim 1, wherein the distance between the upper surface of said chassis and the bottom of said fixing support groove is greater than that between the upper surface of the boss supporting section and the lower surface of the fixing support groove.

3. The structure of claim 1, wherein the distance between the lower surface of said chassis and the upper surface of said fixing support groove is greater than that between the lower surface of the boss supporting section and the upper surface of the fixing support groove.

4. The structure of claim 1, wherein said opening has a diameter which is substantially equal to a length of a side of said rectangular groove.

5. The structure of claim 1, wherein said boss has two supporting sections, one supporting section is external to said opening and said chassis, while one supporting section is flush with said corresponding chassis surface and molded in said fixing support groove.

6. The structure of claim 5, wherein said supporting section molded in said fixing support groove is substantially smaller relative to said supporting section external to said opening.

7. The structure of claim 1, wherein said boss has two supporting sections which are molded in two fixing support grooves of said chassis, each supporting section has a substantially equal size relative to an opposing supporting section.

8. The structure of claim 7, wherein said chassis further includes a plurality of chassis openings within said support grooves, said openings are filled with molded sections which connect each supporting section to an opposing supporting section.

\* \* \* \* \*

UNITED STATES PATENT AND TRADEMARK OFFICE
CERTIFICATE OF CORRECTION

PATENT NO. : 5,842,809
DATED : December 1, 1998
INVENTOR(S) : Haksun Hwang; Inki Cheon; Sang Jig Lee; Pohyoung Koh; Hyeoksoo Park; Sungwoo Choi It is certified that error appears in the above-identified patent and that said Letters Patent is hereby corrected as shown below:

On the title page, item[56]:

Please enter the Foreign Application Data:

Priority Data - Korean Utility Model 30193/1994
(November 15, 1994)

Signed and Sealed this

Third Day of August, 1999

Attest:

Q. TODD DICKINSON

Attesting Officer     Acting Commissioner of Patents and Trademarks